United States Patent [19]
Napier

[11] 3,733,027
[45] May 15, 1973

[54] ELECTRIC FUEL CONTROL FOR GAS GRIDDLE

[76] Inventor: Clarence H. Napier, 3207 N. 53rd Lane, Phoenix, Ariz. 85031

[22] Filed: Mar. 31, 1972

[21] Appl. No.: 240,196

[52] U.S. Cl............236/20, 126/39 J, 236/99
[51] Int. Cl.............................G05d 23/12
[58] Field of Search............236/20 A, 15 A, 99; 126/39 J, 39 H

[56] References Cited

UNITED STATES PATENTS

| | | | |
|---|---|---|---|
| 2,762,360 | 9/1956 | Knoy | 126/39 H |
| 3,463,139 | 8/1968 | Hayashi et al. | 126/39 J |

Primary Examiner—William E. Wayner
Attorney—Eric P. Schellin et al.

[57] ABSTRACT

This specification discloses a griddle comprising a thick griddle plate, a plurality of burners positioned below the plate, a gas header line connected to each of the burners by a branch line in which is included a solenoid operated valve, and a thermostat control switch operatively associated with each solenoid valve with the operation of the switch being controlled by a mercury filled capillary tube, the free end of which is inserted in the griddle plate in close proximity to the upper surface thereof with the lower portion of the tube being insulated from the griddle plate. A pilot is associated with each burner and is connected to the input side of the solenoid valve for that burner.

9 Claims, 6 Drawing Figures

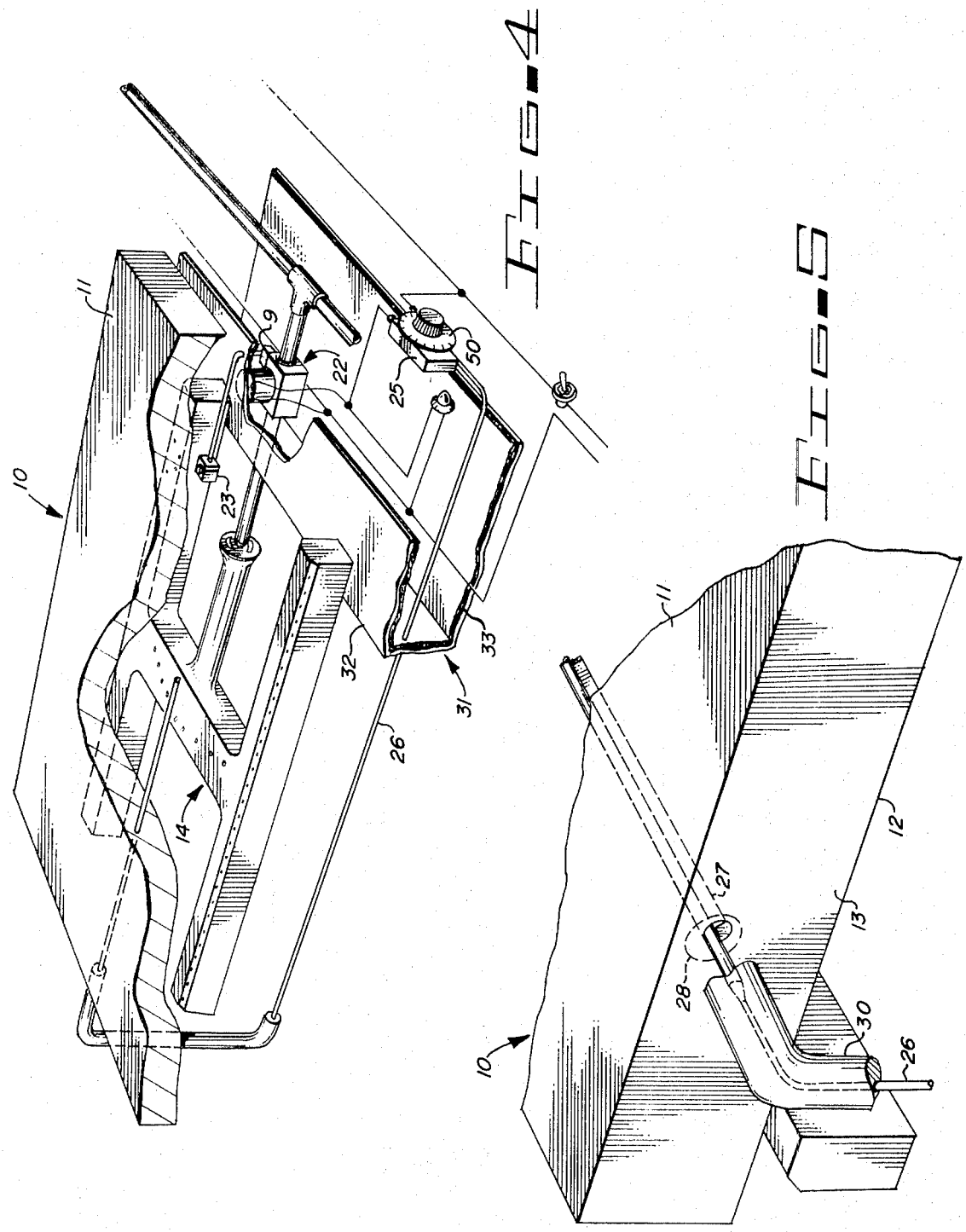

ELECTRIC FUEL CONTROL FOR GAS GRIDDLE

The present invention relates to gas griddles of the type now commonly used in restaurants and is concerned primarily with a griddle which is particularly adapted to cook a frozen hamburger patty.

BACKGROUND OF THE INVENTION

At the present time, restaurants and take-out cooked food establishments look upon the selling of hamburgers as a major part of their trade. Obviously, a cooked hamburger must be in a palatable condition which will satisfy the taste of the customer. Hamburger patties are normally maintained in a frozen state in the establishment where the griddle is located and in order to meet the requirements of a satisfied customer, it has been necessary to thaw out the patties before they are placed on the griddle.

With now known equipment, if a frozen hamburger patty is transferred directly from the freezer to the griddle, there is an immediate drop in the temperature of the cooking surface, usually in the nature of 75° F. With the now known controls for supplying the gas fuel to the burners, there is a considerable lapse of time before the correct cooking temperature is restored to the cooking surface. This lapse of time results in an improperly cooked hamburger.

The equipment which is now being used includes an hydraulically actuated valve for controlling the flow of gas to a burner. Such valves are slow in response to a thermostat and are at least partially responsible for the delay in reacting to a temperature change in the griddle. Then, again, the present practice is to connect one end of a capillary tube which is included as a part of the thermostat to the under surface of the griddle. These griddles are ordinarily of a thickness in the order of two inches and an appreciable amount of time is consumed before a temperature drop on the upper cooking surface is reflected and effective on the capillary tube.

OBJECTS OF THE INVENTION

With the foregoing conditions in mind, the present invention has in view the following objectives:

1. To provide a gas griddle with a fuel control that particularly adapts the griddle to the cooking of frozen hamburger patties.

2. To provide a gas griddle including a thick griddle plate having an upper cooking surface with a fuel control which is almost immediately responsive to a change in the temperature of the cooking surface to restore it to its proper cooking temperature.

3. To provide, in a gas griddle of the character aforesaid, a plurality of burners beneath the griddle plate, with a branch line from a header to each burner and which line includes a solenoid operated valve that is controlled by a thermostatic switch.

4. To provide, in a gas griddle of the above type, a thermostatic switch for each solenoid valve and which switch includes a mercury filled capillary tube which is inserted in the griddle plate in close proximity to the upper surface thereof.

5. To provide, in a gas griddle of the character aforesaid, a capillary tube which is associated with a thermostatic switch and which, when inserted in a griddle plate adjacent to its upper surface, has an upper portion in direct heat conductive contact with the griddle plate and a lower portion which is insulated from the griddle plate.

Various other more detailed objects and advantages of the invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing a gas griddle comprising a thick griddle plate presenting an upper cooking surface, an underface and front and rear faces. A plurality of gas burners are positioned immediately below the undersurface of the griddle plate and each of these burners is connected to a gas supply in the form of a header by a branch line. Included in each of these branch lines is a solenoid operated valve which operates with a snap-action. Each of these solenoid valves has an input side, and a pilot associated with a burner is connected to the input side of the valve.

A thermostatic switch is operatively connected to each solenoid valve. Each of these switches includes a mercury filled capillary tube which extends below the underface of the griddle plate to the rear face where the portion adjacent its free end is inserted in a passage which is formed in the griddle plate in close proximity to is upper surface. Insulation is interposed between the arcuate lower portion of the capillary tube and the plate, while the upper arcuate portion of the tube is in direct heat conducting contact with the plate. That portion of the capillary tube external of the plate is insulated throughout its complete circumferential extent. A channel-like shield carrying a heat insulating material on its inner faces is provided to receive the solenoid operated valves to protect them from the heat of the griddle.

For a full and more complete understanding of the invention, reference may be had to the following description and the accompanying drawings wherein:

FIG. 4 is a perspective of those portions of a griddle which are pertinent to the present invention, and FIG. 5 is a detailed perspective on an enlarged scale of a portion of the griddle plate looking from the rear side thereof.

PREFERRED EMBODIMENT OF THE PRESENT INVENTION

Figure 1:
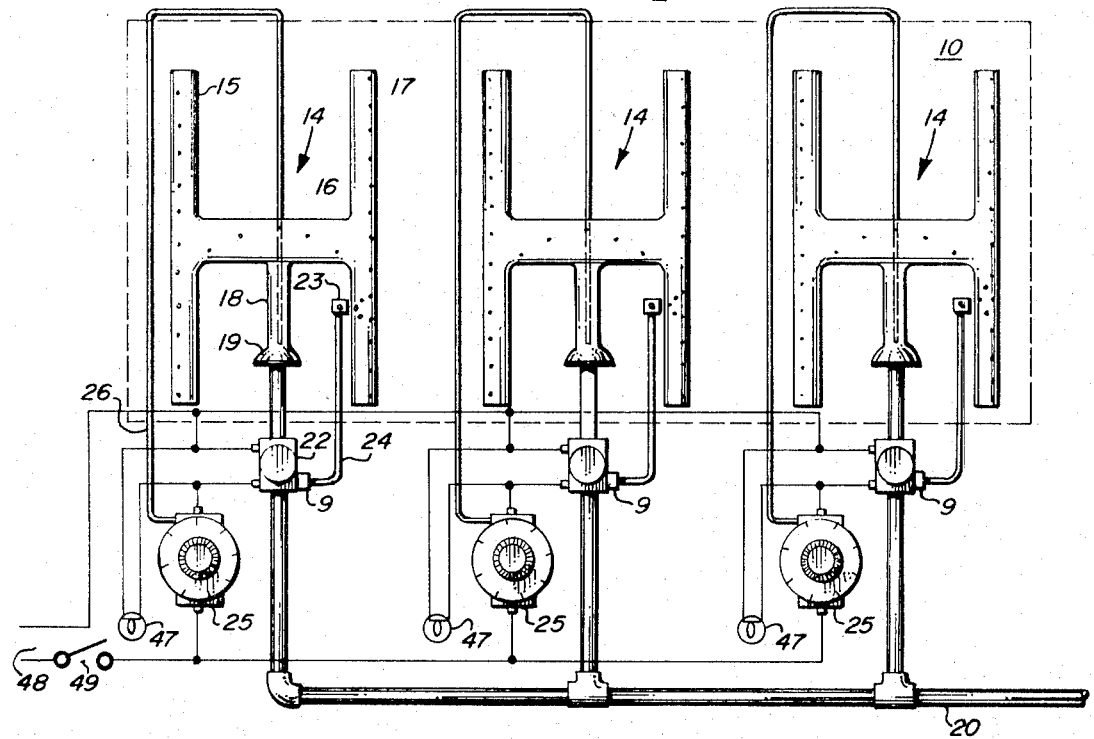
FIG. 1 is a view that is largely diagrammatic, illustrating those portions of a gas griddle which are relevant to the present invention.

Referring now to the drawings, and first more particularly to FIG. 1, it is noted that this view is largely schematic and discloses a somewhat distorted relation of the solenoid operated valves and thermostatic switches to the plate.

Figure 2:
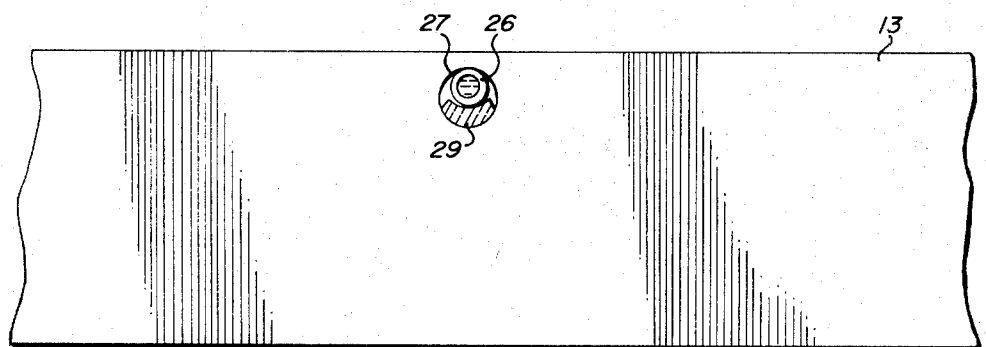
FIG. 2 is an elevation of a portion of the rear surface of the griddle plate as illustrated on an enlarged scale.

A griddle plate is shown in phantom outline in FIG. 1 and designated 10. Plate 10 has an upper cooking surface 11 (FIGS. 4 and 5), a bottom surface 12, and a rear surface 13 (FIGS. 2 and 5). Griddle plate 10 is of a thickness in the nature of two inches. Disposed beneath the undersurface 12 of plate 10 are a plurality of gas burners, each of which is identified in its entirely by the reference character 14. The number of burners 14 will depend on the size of the plate with which they are associated and the number of burners illustrated in FIG. 1 are not to be taken as a limitation on the invention.

Each burner 14 is of H-shape and comprises side tubes 15 which are connected by a cross tube 16. Tubes 15 and 16 are formed with small apertures 17 through which gas emerges.

Connected to the mid-portion of each cross tube 16 and extending towards the front edge of plate 10 is a venturi tube 18 terminating in a bell 19.

A supply for gas fuel takes the form of a header 20. Connected to the header 20 are a plurality of branch lines 21, there being a branch line for each burner 14. Included in each branch line 21 is a solenoid valve which is identified generally at 22 and which is illustrated in more detail in FIGS. 3a and 3b. The free end of branch line 21 enters bell 19 of venturi tube 18 so as to provide the venturi effect when a jet of gas is emitted from branch line 21 to entrain air which enters into the combustion of the gas.

A pilot 23 is associated with each burner 14, being located closely adjacent to the forward portion of a side tube 15. Pilot 23 is connected by a conduit 24 to the input side of valve 22. An adjustable needle valve 9 is provided where conduit 24 is connected to solenoid 22.

A thermostatic switch 25 is provided for each solenoid operated valve 22 to control the operation thereof. Thermostatic switches of this type are well known and available to the public as such. Hence, it is deemed unnecessary to herein disclose the details of a switch 25. It is sufficient to note that one of these switches includes a pair of contacts, one of which is spring biased, and which are sensitive to the effect of a mercury filled capillary tube 26.

As shown more clearly in FIG. 4, each capillary tube 26 extends rearwardly beneath the griddle plate 10 and then upwardly in spaced relation to rear surface 13 of plate 10. Plate 10 is formed with a passage 27 which terminates in surface 13 in a counterbore 28 and extends forwardly to a point spaced from the front edge of plate 10. Capillary tube 26 includes a portion which enters passage 27. The latter is of a diameter larger than that of tube 26 to accommodate heat insulating material 29 which is interposed between the lower arcuate surface of tube 26 and the metal of plate 10. The upper arcuate surface of tube 26 is in direct contact with the metal of plate 10.

It is important to note that passage 27 is formed in close proximity to top surface 11 of plate 10; thus, if plate 10 is two inches thick, the uppermost portion of passage 27 should be about one-quarter of an inch from top surface 11.

Tube 26 is covered with insulation 30 throughout its complete circumferential extent for that portion which is external of plate 10, the free end of this insulation 30 is received in counterbore 28.

Referring now to FIG. 4, a channel-like shield 31 is depicted as in protective position about a solenoid valve 22. It will be understood that shield 31 is of an extent sufficient to receive all of the solenoid valves in the griddle. Shield 31 comprises an outer layer 32 of sheet metal which is of the U-shaped structure illustrated. The inner faces of layer 32 are lined with a heat insulating material such as the asbestos layer 33. Shield 31 is provided because the coil of a solenoid, when energized, will generate heat and it is highly important that this heat be supplemented to only a minimum degree by heat from the griddle.

Figure 3A:
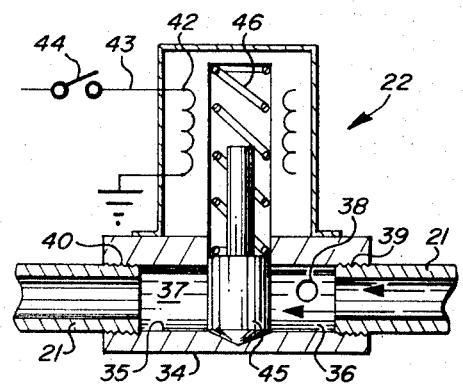
FIG. 3a is a diagrammatic illustration of a solenoid valve in its closed position.
Figure 3B:
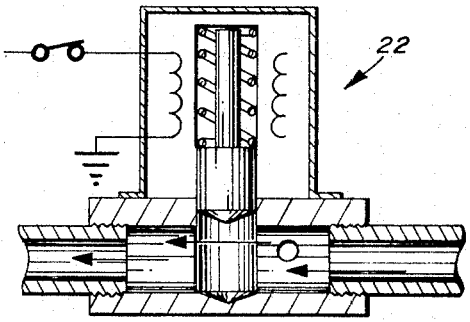
FIG. 3b is another diagrammatic view of a solenoid valve in its open position.

Referring now to FIGS. 3a and 3b, a solenoid valve 22 is shown as comprising a tubular valve casing 34 presenting a bore 35 having an input side 36 and an output side 37. Casing 34 is formed with an opening 38 on the input side 36 and to which one end of a conduit 24 is connected. It is to be remembered that conduit 24 goes to a pilot 23. One section of a branch line 21 is connected to input side 36 as indicated at 39, and the other section of this branch line 21 is connected to output side 37, as shown at 40. It is this section that enters the bell 19 of a venturi 18.

Mounted on casing 34 is a cage 41 which houses a solenoid coil 42. A line 43 is connected to one end of coil 42 and the other end of coil 42 is grounded as indicated at 43. A switch 44 is included in line 43. Switch 44 is a part of a thermostatic switch 25 and is opened or closed by the effect of a mercury filled capillary tube 26.

Reciprocal in cage 41 is a valve plug 45, which, when in an extended position, closes bore 35. It is biased into this closing portion by an expansion coil spring 46. This closed position is depicted in FIG. 3a. When coil 42 is energized, plug 45 is retracted to open bore 35 as illustrated in FIG. 3b.

As shown in FIG. 1, a light 47 is included in the circuit to each solenoid valve 22 so that when the coil 42 of that valve is energized, light 47 is illuminated to indicate the fact that that valve is open.

Electric power from an appropriate source such as a conventional outlet is supplied by lines 48 in which is included a master control switch 49.

OPERATION

While the manner in which the subject griddle is used and its mode of operation are believed to be obvious from the illustrations of the drawings and description of parts set forth above, they are briefly described as follows:

It is first noted that each thermostatic switch 25 includes a dial 50 which is adjustable and which is calibrated for temperature indications. These dials are first set for a desired cooking temperature, such as 350° F. The master switch 49 is closed and if the temperature on the cooking surface 11 of plate 10 is below 350° F, the solenoid valves 52 will open with a snap-action and gas will flow from header 20 through branch lines 21 to the several burners 14. This gas will be initially illuminated by pilots 23.

Immediately after the temperature of cooking surface 11 attains a temperature of 350° F, solenoid valves 22 close. When a frozen hamburger patty is placed on cooking surface 11, the temperature thereof will immediately fall. With a temperature drop in the range of 12°, the mercury in capillary tubes 26 will be affective on the contact switch 44 of the thermostatic switch 25 immediately beneath the burner to close the switch and energize solenoid coil 42 and thus withdraw the valve plug 45 from its closed position with a snap-action. Thus, the supply of gas to the burners is resumed until the desired cooking temperature of 350°F is restored in a matter of a few seconds. This results in a properly cooked hamburger.

When it is desired to clean the griddle, it is unnecessary to adjust the dials 50, in that all that is required is to open the master switch 49 which will cause all solenoid valves 22 to assume a closed position.

While a preferred specific embodiment is herein disclosed, it is to be clearly understood that the invention is not to be limited to the exact constructions, mechanisms and devices illustrated and described, because various modifications of these details may be provided in putting the invention into practice.

What is claimed is:

1. In a gas griddle intended for the cooking of foods and particularly frozen hamburger patties:
   a. a metallic griddle plate of a thickness in the order of two inches and having a top cooking surface, a bottom surface and a rear surface;
   b. a plurality of gas burners arranged in spaced relation below said bottom surface;
   c. a supply of gas in the form of a header;
   d. a plurality of branch lines extending from said header to said burners, there being a branch line for each of said burners;
   e. a solenoid operated valve in each of said branch lines including a coil, and controlling the flow of gas therethrough;
   f. a thermostatic switch associated with each of said solenoid operated valves and including a switch controlling the current through said coil, and
   g. a mercury filled capillary tube for each thermostatic switch and having a free end portion inserted in said griddle plate in close proximity to the top surface thereof above a burner.

2. The gas griddle of claim 1 in which each of said capillary tubes passes below the bottom surface of said plate and up the rear surface to the point where it is inserted in said plate.

3. The gas griddle of claim 1 in which a passage having a cross-section greater than that of a capillary tube is formed in said plate and extends from the rear face thereof onto which it opens to a point spaced from the front end of the plate and centrally of a burner, together with insulation between the bottom portion of said passage and that portion of the capillary tube which is received therein with the capillary tube in contact with the plate at the upper portion of said passage.

4. The gas griddle of claim 3 together with insulation completely covering each capillary tube from the point where it enters the plate to the thermostatic switch.

5. The gas griddle of claim 4 in which each passage in the griddle terminates in a counterbore at the rear surface and the insulation completely covering a capillary tube is received in said counterbore.

6. The gas griddle of claim 1 together with a channel-like heat insulating shield receiving said solenoid operated valve.

7. The gas griddle of claim 1 in which each solenoid operated valve has an input side together with a pilot associated with a burner, and which is connected to the input side of the solenoid valve.

8. The gas griddle of claim 1 together with an indicating light included in the circuit of the coil of the solenoid of each valve to indicate when said solenoid is energized.

9. The gas griddle of claim 1 in which each burner includes an open end venturi tube and the branch line for that burner extends into said venturi tube in spaced relation relative thereto.

* * * * *